United States Patent
Figler et al.

[11] 3,848,129
[45] Nov. 12, 1974

[54] SPECTRAL DISCRIMINATING RADIATION DETECTION APPARATUS

[75] Inventors: Burton D. Figler, Winthrop; Theodore J. Nussdorfer, Lexington, both of Mass.

[73] Assignee: Sanders Associates, Inc., Nashua, N.H.

[22] Filed: Aug. 24, 1973

[21] Appl. No.: 392,164

[52] U.S. Cl. .................................. 250/339, 250/342
[51] Int. Cl. ................................................ G01t 1/16
[58] Field of Search ............ 250/339, 342, 347, 349

[56] References Cited
UNITED STATES PATENTS

| | | | |
|---|---|---|---|
| 2,927,212 | 3/1960 | Shimukonis et al. | 250/342 |
| 3,026,413 | 3/1962 | Taylor | 250/339 |
| 3,662,171 | 5/1972 | Brengman et al. | 250/342 |

*Primary Examiner*—Archie R. Borchelt
*Assistant Examiner*—Davis L. Willis
*Attorney, Agent, or Firm*—Louis Etlinger; Richard I. Seligman

[57] ABSTRACT

Radiation detection apparatus which is capable of discriminating between radiations having different spectral characteristics such as between an aircraft or missile and a cloud or a flare. A spinning reticle carrying a pair of spectral filters is arranged in the path of incident radiation upon a detector cell such that during each reticle revolution, the detector cell is illuminated by radiation which passes through one of the filters and then through the other of the filters. One of the spectral filters is given a passband which matches the wavelength band in which the true target radiation is maximum (infrared region) and the other spectral filter is given a passband in the wavelength band (near visible infrared region) where the false target radiation is much more intense than that of the true target. The infrared or long wavelength filtered signal sample and near visible or short wavelength filtered signal sample are then separated from one another temporarily stored and compared with one another to detect true targets as distinguished from false targets.

6 Claims, 9 Drawing Figures

SPECTRAL DISCRIMINATING RADIATION DETECTION APPARATUS

BACKGROUND OF THE INVENTION

This invention relates to radiation detection apparatus and in particular to such apparatus which is capable of discriminating between radiations having different spectral characteristics, such as an aircraft or missile from a cloud or a flare.

Radiation detection apparatus is useful to detect target sources, such as aircraft, missiles and the like, in an environment which includes reflected solar radiation as from clouds, trees, mountains and the like, as well as radiation emitted by flares or other similar devices. Such apparatus has general application in aircraft and/or missile guidance and control.

2. Prior Art

There have been several prior art attempts to solve the problem of distinguishing radiation from a true or desired target from other radiations due to clouds, trees, mountain peaks, flares and other undesired targets or sources. Generally, these attempts have employed the principle that the radiation from an aircraft or missile target differs from that of a sun illuminated cloud or a flare decoy by its color temperature. The low temperature targets have their maximum spectral energy emitted at a longer wavelength than the higher temperature false targets. By comparing measurements at two narrow spectral bands, the color temperature of a radiating source is determined and the discrimination of target and false target determined. In most of the prior art solutions, first and second filters are employed with passbands in the short and long wavelength infrared regions, respectively. First and second corresponding detectors then convert the filtered radiation into first and second electrical signals. The first signal is then either balanced with the second signal (U.S. Pat. No. 2,927,212) to reduce the effect of solar radiation in the second or target signal or simply employed to enable or disable (U.S. Pat. Nos. 3,219,826 and 3,147,381) the second or target signal. A disadvantage of such prior art radiation detectors is that the two separate radiation detectors do not track one another with variations in ambient light level, ambient temperature or have the optical registration to measure radiation from the same spot in space. As a result, the processing of detector responses are often not solely based on color temperature, thereby resulting in unreliable operation.

BRIEF SUMMARY OF THE INVENTION

An object of this invention is to provide novel and improved radiation detection apparatus.

Another object is to provide novel and improved radiation detection apparatus which is capable of discriminating between radiations having different spectral characteristics.

Still another object is to provide radiation detection apparatus which is capable of discriminating radiations from different sources but yet employs a single detector.

Briefly, radiation detection apparatus embodying the present invention, like prior art detectors, includes an optical device for collecting incident radiations, a filter for filtering the collected radiations and a detector element for converting the filtered radiations into an electrical signal which is a continuous function of time. The novel improvements which characterize the invention are as follows: a single detector preceded by a revolving reticle coated with alternating areas of first and second bandpass spectral filters, which pass radiation of relatively long and short wavelengths sequentially. The spectral filters are so arranged on the reticle and the detector is so located that the detector element receives filtered radiation from the first and second filters alternately as the reticle rotates. The number of filtered elements on the reticle is a trade-off of the filter costs vs. the need for precision in optical registration between sequential first and second wavelength measurements. Means is provided to produce first and second sampling signals as the reticle rotates. A signal conversion means responds to the first and second sampling signals to convert the electrical signal produced by the detector element into first and second signal samples indicative of long and short wavelength filtered radiation, respectively. A comparison circuit then compares the first and second sequences of signal samples with one another to produce a comparison signal. A target signal is then produced whenever the amplitude of the comparison signal is equal to or greater than a predetermined value. For the example to be described, the first and second sample signals occur once sequentially during one revolution of the reticle.

BRIEF DESCRIPTION OF THE DRAWINGS

In the accompanying drawings like reference characters denote like elements of structure.

DESCRIPTION OF THE PREFERRED EMBODIMENT

It is contemplated that radiation detection apparatus embodying the present invention may be employed in any application where it is desired to discriminate between targets having different spectral characteristics. However, by way of example and completeness of description, radiation detection apparatus embodying the invention is illustrated herein as a warning system for an aircraft. The system is mounted in or on the aircraft tail section and serves to not only detect other aircraft which are trailing but also to discriminate between such aircraft and other point source targets such as clouds, trees, mountain peaks, towers and the like. Upon detection the apparatus produces a coordinate display of the azimuth and elevation location of an aircraft target.

Figure 1:
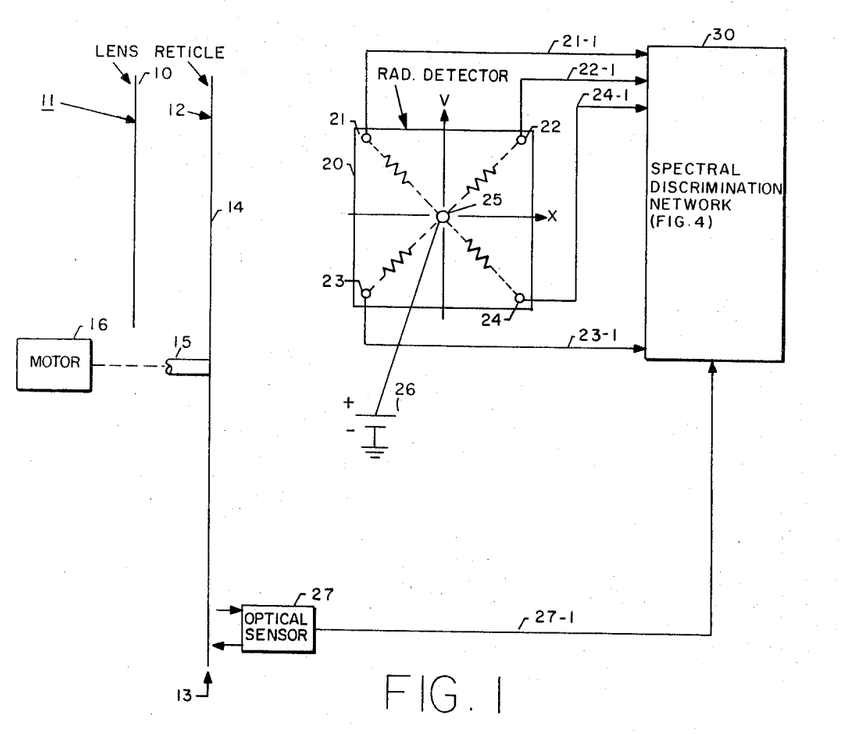
FIG. 1 is a schematic diagram of radiation detection apparatus embodying the present invention.

Referring to FIG. 1, radiation detection apparatus embodying the present invention includes an optical device or lens 10 for collecting incident radiation illustrated diagrammatically at 11 by an arrow. Elements 12, 13 and 14 serve to spatially filter the collected radiations as well as to color separate desired from undesired or false target radiations. A radiation detector 20 converts the filtered radiation into electrical signals. A spectral discrimination network 30 processes the signals produced by the detector 20 so as to produce typical coordinate signals for an electronic display device such as a cathode ray tube (not shown in FIG. 1).

Element 12 constitutes a reticle fabricated on a first planar surface of substrate 13, which faces the lens 10. The reticle 12 takes the form of a suitable geometrical pattern of areas which are opaque and areas which are transparent to the incident radiation in the wavelength band of interest. As the substrate 13 is rotated by means of a motor 16 coupled to the drive shaft 15, the geometrical pattern 12 acts to scan or chop the collected radiations so as to enhance the detection of point source targets such as airplanes or missiles, in the presence of background radiations. That is, the spinning reticle with its geometrical scanning pattern acts to spatially filter the radiations collected by the lens 10.

Any suitable geometrical pattern may be employed for the spatial filtering operation. By way of example, a checkerboard or spoke pattern may be used. As an example of possible geometrical patterns, reference is made to the textbook entitled "Reticles in Electro-Optical Devices" by Lucien N. Biberman, 1966.

Preferably the motor 16 comprises a hysteresis synchronous motor with a belt drive linkage to the reticle shaft 15.

The output signals produced by detector 20 are functions of the position or loaction of the detector surface where the lens 10 focuses an image of a radiating point source target. The detector 20 preferably takes the form of a five electrode variable impedance lead sulfide(PbS) detector of the type described at column 7 of U.S. Pat. No. 3,657,548. One of these electrodes 25 is located at the detector cell center. A d.c. bias source, illustrated as a battery 26, applies a d.c. bias to the center electrode 25 with the illustrated polarity. The other four electrodes 21 to 24 are located at the cell corners and are connected to output leads 21–1 to 24–1, respectively. The dashed connections of resistors between the center electrode 25 and each of the corner electrodes 21 to 24 diagrammatically illustrate the approximate equivalent circuit.

In the illustrated embodiment, the center (electrode 25) of the detector 20 coincides with the optical axis of the lens 10. When a point source target image as modulated by the reticle scanner 12 lands on the detector center electrode 25, positive going signals of equal amplitude are produced on the output leads connected to each of the output electrodes 21 through 24. These equal amplitude signals are balanced or nulled in the network 30 to produce a target on-axis or on boresight condition. If the radiation pulse lands at another point on the detector surface, the amplitudes of the positive going signals produced at the output electrodes will be functions of the displacement from the cell center. These signal amplitudes are then compared with one another in network 30 so as to produce signals indicative of the amount and direction of displacement from the cell center. The actual comparisons made are dependent upon the definition of elevation and azimuth with respect to the orientation of the cell 20. For the illustrated embodiment, the elevation and azimuth directions are considered as the vertical and horizontal, respectively, illustrated by the Y and X coordinate axis which are superimposed upon the cell 20 with the origin coinciding with the cell center. For such a definition, it can be determined if a target is either on or to the right or left of the Y axis by comparing the sum of the signals at electrodes 22 and 24 with the sum of the signals at electrodes 21 and 23. Similarly, it can be determined if the target image is either on or above or below the X axis by comparing the sum of the signals at electrodes 21 and 22 with the sum of the signals at electrodes 23 and 24. The results of these comparisons are then employed to generate X and Y signals indicative of the amount of displacement of the target image from the X and Y axis, respectively.

Figure 2:
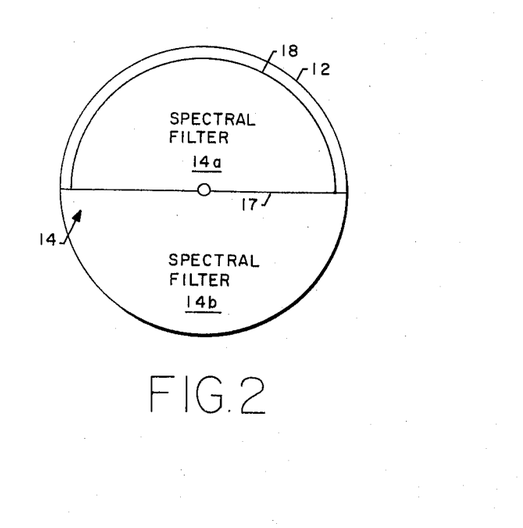
FIG. 2 is a plan view of one surface of a reticle upon which are mounted a pair of spectral filters.

In accordance with a feature of the present invention, the reticle 12 has mounted on its rear surface 14 a pair of spectral filters 14a and 14b, best seen in FIG. 2, in which the reticle is shown in reduced size for convenience. Each filter comprises a different 180° segment of the reticle surface as illustrated by the boundary line 17. The spectral filter 14b is given a pass band which substantially matches the wavelength band in which the major portion of the spectral energy radiated by the desired target occurs. For the case of an aircraft or missile target, this passband is in the infrared region and may extend from 2.8 to 3.2 microns. On the other hand, the spectral filter 14a is given a passband which is distinct from that of filter 14b and which is chosen in accordance with the spectral energy distribution of unwanted or undesired targets. For example, the radiation from most undesired targets such as flares, clouds or land objects have a rather high spectral content in the near visible region of the infrared spectrum. Accordingly, in many applications the spectral filter 14a is given a passband in the near visible region. For the illustrated embodiment where it is desired to distinguish the desired target from a cloud which is reflecting solar radiation, the spectral filter 14a is given a passband from 2.0 to 2.5 microns.

As the reticle rotates, the detector 20 is covered first by one spectral filter then by the other so that it receives a pulse or sample of both long and short wavelength filtered infrared radiation during each revolution. The time during each revolution that the detector is covered by each spectral filter is determined in the illustrated embodiment by means of a mirror coating 18 (FIG. 2) which is arranged in a circumferential band on filter 14a adjacent the periphery of the reticle. An optical sensor 27 which includes a light source and a light responsive device cooperates with this outer circumferential band to sense which spectral filter covers the detector at any given instant in time. A large value of reflected energy indicates the shorter wavelength passband (filter 14a) and a low value of reflected energy indicates the longer passband (filter 14b). For the aforementioned exemplary design, the optical sensor 27 takes the form of a light emitting diode and photo transistor package available from Fairchild Semiconductor Corp. Model FPLA–850.

The output signal of the optical sensor 27 on lead 27–1 is employed in the spectral discrimination network 30 to synchronously gate or switch the output signals of the detector 20 to appropriate long and short wavelength processing circuits. This output signal of the sensor 27 is an approximate squarewave. That is, it has an approximate 50 percent duty cycle since the mirror coating 18 covers a 180° annular segment of the reticle disc. In order that the selected signal samples from detector 20 truly correspond to either one spectral filter or the other, this squarewave output of the sensor 27 is modified so as to inhibit the selection of a signal sample during the time that the filter boundary 17 is sweeping across the detector 20. In FIGS. 3A to 3D, the reticle is shown for four different positions of the spectral filters with respect to the detector 20 and the sensor 27. As shown in each of these figures, the optical sensor 27 is located slightly in advance of (say 15°) for a reticle speed of 60 revolutions per minute rather than at the edge of detector 20 so as to permit adjustment of the blanking time intervals during transition across the filter boundary. As shown in FIG. 3B, this results in a delay $\Delta\ t1$ from the time the boundary 17 passes under the sensor 27 until it reaches the corner of the detector 20. FIG. 3C shows the second delay of $\Delta\ t2$ which corresponds to the time required for the boundary 17 to sweep across the detector 20. The filter 14a then covers the detector 20 until the boundary 17 again passes by the sensor 27 to signify the approach of the filter 14b as depicted in FIG. 3D.

Figure 4:
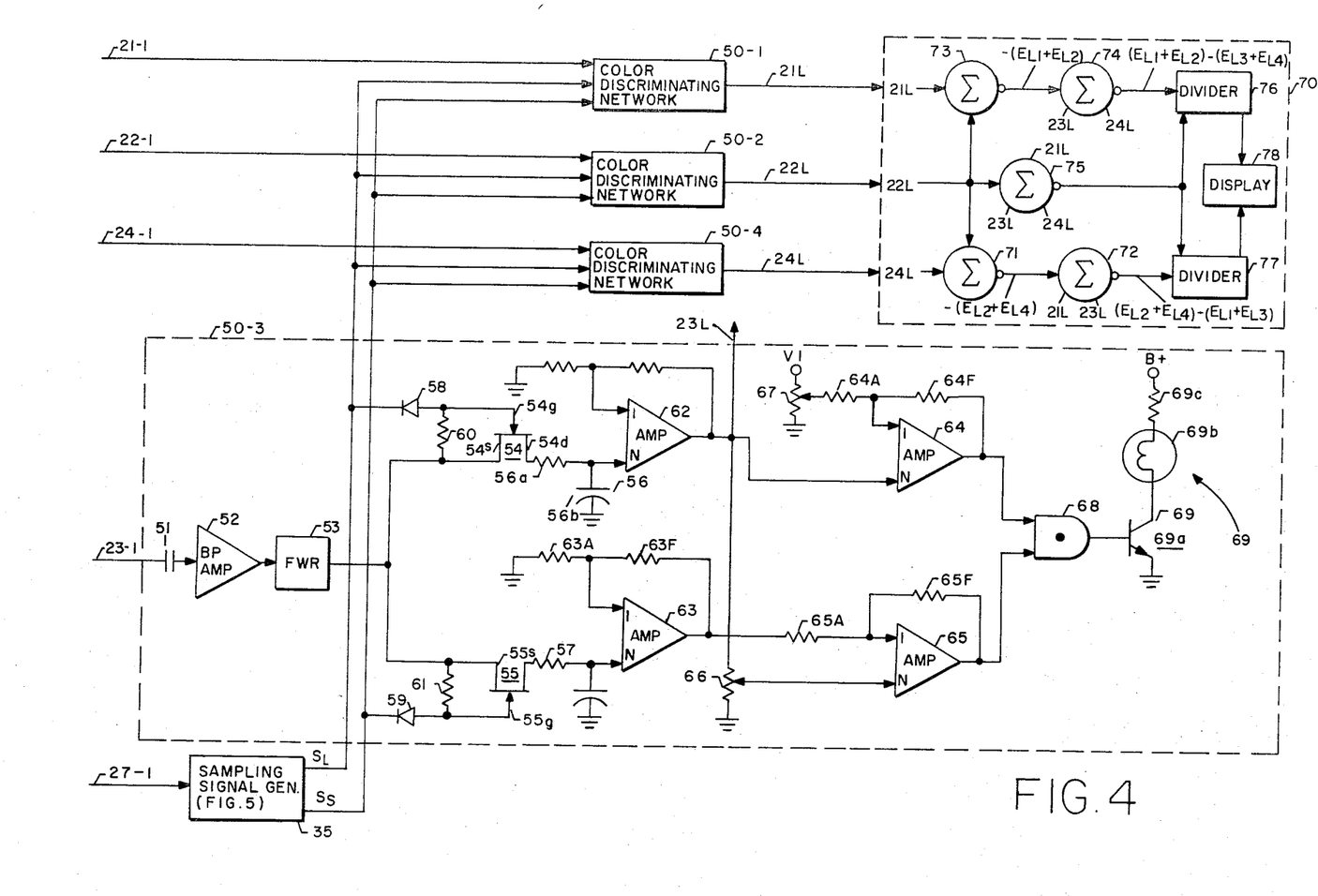
FIG. 4 is a block diagram of the spectral discrimination network of the FIG. 1 embodiment.

Referring now to FIG. 4, the spectral discrimination network 30 is shown to include separate color discriminating networks 50-1 through 50-4 coupled to the output leads 21-1 through 24-1, respectively, of the detector 20. A sampling signal generating network 35 is coupled to the output lead 27-1 of the optical sensor 27 and is operative to modify the output signal thereof to produce long and short wavelength sampling signals SL and Ss, respectively. The color discriminating networks 50-1 through 50-4 respond to the sampling signals SL and Ss to select from their associated input signals samples of the long and short wave filtered radiation, respectively. These signal samples are then operated upon to discriminate whether a point source target image is a true or false target. Each of the networks 50-1 through 50-4 also produces a signal on their respective output leads 21L through 24L, the amplitudes of which signals are indicative of the location of a point source target image on the surface of the detector 20. These signals are then processed in a signal comparator and display network 70 which produces an XY coordinate display of the relative target azimuth and elevation, respectively for the aircraft operator.

Since each of the color discriminator networks 50-1 through 50-4 comprises a substantially identical network, only the network 50-3 is illustrated in detail. With reference now to the network 50-3, the detector output signal on lead 23-1 is AC coupled via capacitor 51 to a band pass amplifier 52. The band pass amplifier 52 is operative to both amplify the signal and to pass only those frequency components which are within the band of interest as determined by the reticle speed. In the aforementioned exemplary design, the band pass amplifier 52 has a pass band of 300 Hz centered on a frequency of 5 KHz. The band pass amplifier 52 may suitably take the form of circuit 12 shown at page 90 of The Handbook of Operational Amplifier Active RC Networks, a publication of Burr-Brown Research Corporation, Tucson, Ariz., 1966.

After full wave rectification in a full wave rectifier 53 (e.g., a diode bridge) the pass band filtered signal is applied to each of a pair of analog switches, shown as junction field effect transistors 54 and 55. The transistors 54 and 55 are responsive to the SL and Ss sampling signals to gate or switch corresponding samples of the filtered and rectified output signal from the detector output lead 23-1 to low pass filters 56 and 57, respectively. To this end, the transistors 54 and 55 have their gate leads 54g and 55g coupled by way of diodes 58 and 59 to receive the SL and Ss sampling signals, respectively. Transistor 54 has a resistor 60 connected between its gate lead 54g and source lead 54s. Similarly, transistor 55 has a resistor 61, coupled between its gate lead 55g and its source lead 55s. The purpose of the diode and resistor network for each of these transistors is for reverse voltage protection and gate to source current bleed.

Each of the low pass filters 56 and 57 includes a series resistor and a shunt capacitor. Thus, series resistor 56a is coupled between the drain lead 54d and the shunt capacitor 56b. The output signals from the low pass filters 56 and 57 are then coupled to the non-inverting inputs N of amplifiers 62 and 63 which serve to amplify the low pass filter signals in a non-inverting manner. The shunt capacitors in each of the low pass filters essentially serve as a storage element when its associated transistor is turned off. This is so since there is substantially no leakage between the drain and source and drain and gate electrodes of a turned off junction field effect transistor. In addition, each of the amplifiers 62 and 63 takes the form of an operational amplifier having a very high input impedance. Each of the operational amplifiers 62 and 63 is connected for operation as a non-inverting amplifier. For example, amplifier 63 has a feedback resistor 63f connected between its outputs and inverting (I) terminals. An input resistor 63a is connected between the inverting input terminal I and circuit ground. As is well known the gain of such an amplifier is proportional to the sum of the feedback and input resistors divided by the input resistor.

The output of amplifier 63 is coupled via a resistor 65A to the inverting input I of an operational amplifier 65. The output of amplifier 62 is coupled to one end of a variable resistor 66 (e.g., a potentiometer), the other end of which is coupled to circuit ground. The tap of variable resistor 66 is coupled to the noninverting input of operational amplifier 65. To complete the circuit of operational amplifier 65, a feedback resistor 65F is connected between its output and inverting I input terminals. With these connections, the operational amplifier 65 operates as a differential amplifier.

The differential amplifier 65 cooperates with amplifier 62 and 63 and the variable resistor 66 to compare the long and short wavelength filtered signals during each reticle revolution for discrimination between true and false targets. As pointed out previously, if a target is true the long wavelength filtered signal will have its maximum amplitude. On the other hand if a target is false, the short wavelength filter signal will have its maximum amplitude. Considering the amplitudes of the long and short wavelength filtered signals as $E_L$ and $E_S$ (at the outputs of filters 56 and 57), respectively, the ratio of $E_L/E_S$ will signify a true target when it is equal to or greater than a constant K. If the ratio is less than K, the target is false. In the exemplary design, it has been found that K is approximately 10.

To accomplish the aforementioned comparison, the gain of amplifier 63 is made larger than the gain of amplifier 62 by a factor of K or 10. The differential amplifier 65 then takes the difference $E_L - KE_S$ between these two signals. This difference signal is then applied to one input of an AND gate 68. If the difference signal is equal to or greater than the threshold voltage of gate 68, a true target is signified. On the other hand, if the difference signal is less than the threshold of gate 68, a false target is signified. For the exemplary design, gate 68 takes the form of a conventional diode AND gate with a threshold of five volts less the voltage drop of a forward biased diode.

For the case where there are no point source targets within the field of view of the lens 10, $E_S$ and $E_L$ may have values which would cause the difference $E_L - KE_S$ to exceed the threshold of gate 68. For this reason, gate 68 is conditioned to pass or respond to the output of amplifier 65 only when the signal amplitude $E_L$ is sufficiently large to signify the presence of a point source target. To this end, AND gate 68 has its other input connected to the output of a voltage comparator amplifier 64 which compares the signal amplitude $E_L$ with a fixed reference value. To this end, the amplifier 64 has its noninverting input N coupled to the output of amplifier 62 and its inverting I coupled via an input resistor 64A to the tap of a variable resistor 67. The resistor 67 is connected between a voltage source, designated as V1, and circuit ground. The reference voltage to which the signal amplitude $E_L$ is compared is then a function of the setting of the tap on variable resistor 67. To complete the circuit of amplifier 64 a feedback resistor 64F is coupled between its output and inverting input terminals. For the exemplary design, the values of the voltage source V1 and resistor 67 are selected so as to produce a reference voltage on the order of 5.0 volts.

So long as the $E_L$ amplitude is less than the reference voltage, the output of amplifier 64 will be below the threshold of gate 68. As a result, gate 68 will be disabled. When the $E_L$ amplitude exceeds the reference voltage by an amount equal to or greater than the threshold of AND gate 68, AND gate 68 will at that time become enabled to respond to the changes in signal condition at the output of amplifier 65. The output of AND gate 68 is then employed to drive an indicating lamp circuit 69. The lamp circuit 69 includes an NPN transistor 69a having its base lead connected to the output of gate 68, its emitter lead connected to circuit ground and its collector lead connected in series with an indicating lamp 69b, a load resistor 69c and a voltage source designated as B+.

When both inputs of AND gate 68 exceed its threshold, the output of AND gate 68 is a positive voltage so as to forward bias transistor 69a and cause the lamp 69b to give a visible indication that the image of a true target is being detected by the detector 20. On the other hand, when either or both of the inputs to gate 68 are below its threshold, its output is at or near ground potential so that transistor 69a is reverse biased and thereby turned off. Accordingly, the lamp 69b is off for this condition.

To summarize the operation of the color discrimination network 50–3, the $S_L$ and $S_S$ sampling signals turn the transistor switches 54 and 55 on during the first and second time intervals, respectively, during each reticle revolution. When one switch is on the other is off. When a transistor switch is on it passes a sample of the filtered and full wave rectified detector output signal to its associated low pass filter 56 or 57. The amplifiers 62, 63 and 65 coact to continuously compare the amplitude values $E_L$ and $E_S$ of the signal samples at the outputs of filters 56 and 57. During a first time interval when transistors 54 and 55 are on and off, respectively, the amplitude value $E_L$ is being updated and compared to the value $E_S$ taken during the preceding time interval. During a second or next succeeding time interval when transistors 54 and 55 are turned off and on, respectively, the amplitude value of $E_S$ is being updated and compared to the $E_L$ value taken during the first or preceding time interval. If the output of amplifier 65 ($E_L - KE_S$) is below the threshold of gate 68, the indicator lamp 69b is turned off. On the other hand, if the difference signal $E_L - KE_S$ is equal to or greater than the threshold of AND gate 68, the indicator lamp 69b is turned on to indicate the presence of a true point source target.

As pointed out previously, the color discriminating networks 50–1, 50–2 and 50–4 contain substantially identical circuits as the network 50–3 such that their respective indicating lamps are turned on when the image of a true target is located on the detector surface near the corresponding detector electrodes. The long wavelength filtered signals $E_L$ of the color discriminating networks 50–1 through 50–4 are coupled via leads 21L through 24L, respectively, to a signal comparator network 70 which serves to compare the $E_L$ signals with one another so as to produce X and Y or azimuth and elevation signals indicative of the target position relative to the axis of the detector cell. In network 70 a number of conventional signal addition circuits are depicted by a circle labeled with $\Sigma$. The small bubbles at the outputs of each of these networks signify that there is a signal inversion or a multiplication by $-1$. Each of these networks may suitably take the form of the summing amplifier shown at page 59 of "Handbook of Operational Amplifier Applications", First Edition, 1963, a publication of Burr-Brown Research Corp. of Tucson, Ariz. In addition the signal leads have been broken and labeled inside block 70 in the interest of clarity.

The comparisons made in the network 70 are dependent upon the definition of elevation and azimuth with respect to the orientation of the detector cell 20 (FIG. 1). For the illustrated embodiment, the elevation and azimuth directions are considered as the vertical and horizontal, respectively, illustrated by the Y and X coordinate axes which are superimposed upon the cell 20 with the origin corresponding with the cell center. For such a definition, it can be determined if the target is either on or to the right or left of the Y axis by comparing the sum of the signals at electrodes 22 and 24 with the sum of the signals at electrodes 21 and 23. To this end, signal addition networks 71 and 72 are arranged to receive the $E_L$ signals from leads 21L to 24L which correspond to the output signals on the detector output leads 21–1 to 24–1, respectively. In the discussion which follows, these $E_L$ signals are designated as $E_{L1}$ to $E_{L4}$ for the leads 21L to 24L, respectively. The signal addition network 71 receives the $E_{L2}$ and $E_{L4}$ signals from the leads 22L and 24L and produces at its output a signal of magnitude $-(E_{L2} + E_{L4})$. The signal addition network 72 adds the signal $-(E_{L2} + E_{L4})$ to the signals $E_{L1}$ and $E_{L3}$ received from the leads 21L and 23L to produce at its output a signal having a value $(E_{L2} + E_{L4}) - (E_{L1} + E_{L3})$. If this signal has a value of 0, the target is on the Y axis. If the signal has a positive or a negative value, the target is to the right or left, respectively, of the Y axis.

In a similar manner, the signal addition networks 73 and 74 are arranged to determine whether the target is either on or above or below the X axis by comparing the sum of the signals $E_{L1}$ and $E_{L2}$ with the sum of the signals $E_{L3}$ and $E_{L4}$. To this end, signal addition network 73 receives the $E_{L1}$ and $E_{L4}$. To this end, signal addition network 73 receives the $E_{L1}$ and $E_{L2}$ signals from leads 21L and 22L, respectively, to produce at its output a signal having a value of $-(E_{L1} + E_{L2})$. The signal addition network 74 then adds the signal $-(E_{L1} + E_{L2})$ to the signals $E_{Le}$ and $E_{L4}$ received on the leads 23L and 24L to produce at its output a signal having a value $(E_{L1} + E_{L2}) - (E_{L3} + E_{L4})$. If this signal has a value of 0, the target is on the X axis. If this signal has a positive or negative value, the target is above or below the X axis, respectively.

These two coordinate signals are proportional to the product of target intensity and target displacement from boresight. In this form, they are not directly useful in many servo and/or display systems. However, the target intensity factor can be removed by dividing each of these coordinate signals by the sum of the four $E_L$ signals. To this end, a further signal addition network 75 receives the $E_{L1}$ to $E_{L4}$ signals on the leads 21L to 24L to produce at its output a signal having a value $-(E_{L1} + E_{L2} + E_{L3} + E_{L4})$. This signal is applied to the divisor inputs of each of a pair of divider networks 76 and 77. The divider networks 76 and 77 receive at their dividend inputs the X and Y output signals of the addition networks 74 and 72, respectively. The signals produced at the quotient output terminals of the dividers 76 and 77 are now in a proper coordinate form to indicate the X and Y coordinates of the target in the field of view independently of target intensity. These quotient output signals are applied to a display device 78 such as an oscilloscope.

Figure 5:
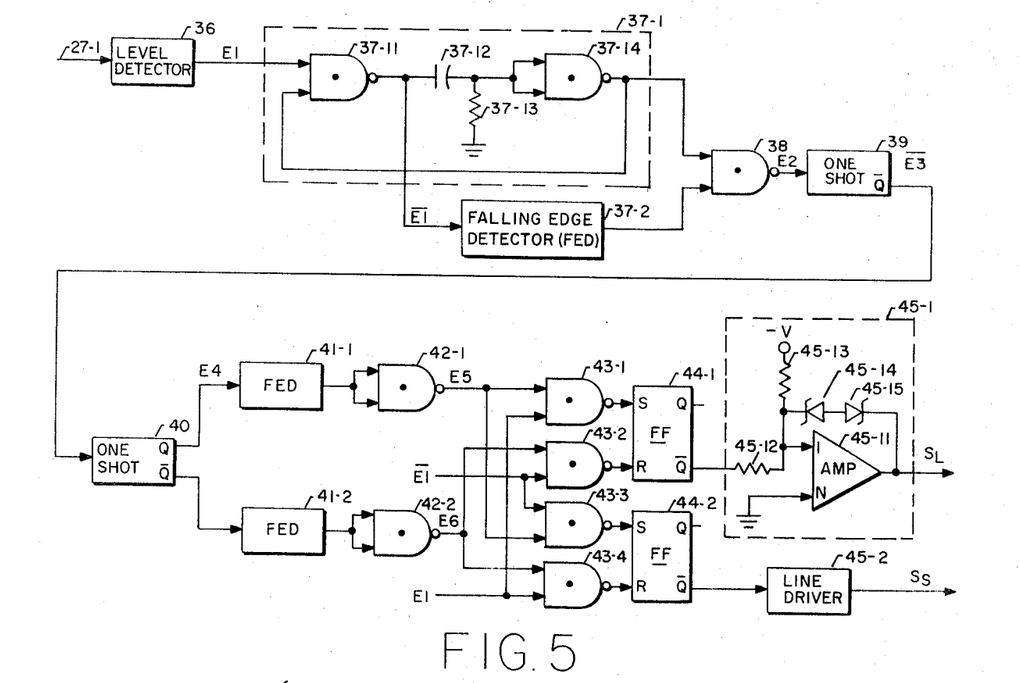
FIG. 5 is a schematic diagram of the sampling signal generator block shown in FIG. 4.
Figure 6:
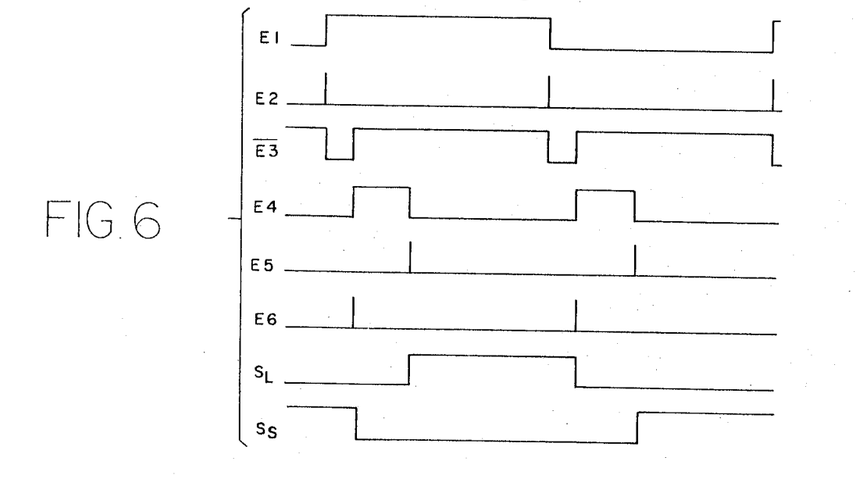
FIG. 6 is a waveform diagram for various signals occurring at different points in the FIG. 5 diagram.

The sampling signal generator 35 will now be described with reference to the schematic diagram of FIG. 5 and the waveform diagram of FIG. 6 which portrays the waveform of the signals occurring at various points in the schematic diagram. The sampling generating network includes a level detector 36 which receives on lead 27-1 the output signal of the optical sensor 27 (FIG. 1). The level detector serves to detect excursions of the optical sensor squarewave output signal which exceed the detector threshold to produce at its output a squarewave which is shifted in d.c. level. Due to the presence of noise, the level detector preferably takes the form of the design of a level detector with hysteresis described at pages 165 and 166 of Fairchild Semiconductor Linear Integrated Circuits Applications Handbook, 1967, a publication of Fairchild Semiconductor.

The squarewave output signal El of level detector 36 is applied to a falling edge detector circuit 37-1 which produces at its output a narrow negative going pulse for each falling edge or negative going transition of the El signal. A substantially identical falling edge detector (FED) 37-2 responds to the complement signal $\overline{E1}$ to produce at its output a narrow negative going pulse for each falling edge of the $\overline{E1}$ signal. These two sequences of negative going pulses are then ORRED together and inverted by means of a NAND gate 38 to produce the sequence of positive going pulses E2.

Since the FED's 37-1 and 37-2 as well as the FED's 41-1 and 41-2 employ substantially similar circuits, only the FED 37-1 is illustrated in detail. FED 37-1 is shown to include a NAND gate 37-11 which receives at one input the output signal E1 of the level detector 36. The output of the NAND gate 37-11 is differentiated by a differentiator which includes a series capacitor 37-12 and a shunt resistor 37-13. The differentiated signal is then inverted by means of a two input NAND gage 37-14 which has both of its inputs coupled to the output of the differentiator. The output of the NAND gate 37-14 is then applied to one input of the NAND gate 38 as well as to the other input of the NAND gate 37-11. With these circuit connections, the NAND gate 37-11 essentially operates as an inverter so as to produce at its output the complement signal $\overline{E1}$. This complement signal in addition to being differentiated by the differentiator is also applied to the FED 37-2. As mentioned previously, the FED 37-2 is operable to detect the falling edges of the complement $\overline{E1}$ (and hence, the rising edges of the signal E1 so as to produce a sequence of negative going pulses corresponding to such falling edges. The FEDS 37-1 and 37-2 and the NAND gate 38 thus cooperate as a zero crossing detector so as to produce a sequence of positive going pulses E2, each pulse coinciding with an axis or zero crossing of the signal E1.

Figure 3A:
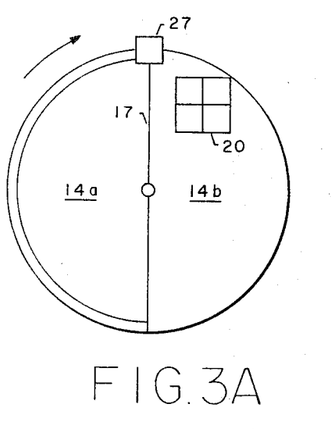
FIGS. 3A to 3D are plan views of the other surface of the reticle illustrating different positions of the spectral filters relative to the detector cell.
Figure 3B:
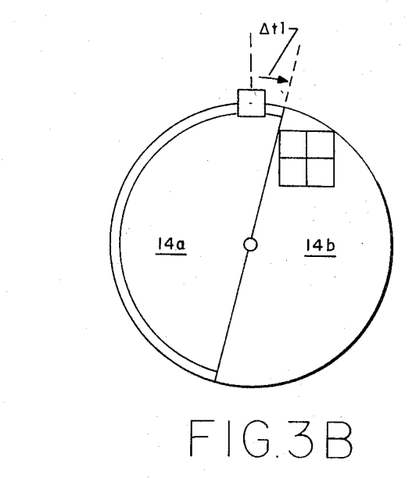
Figure 3C:
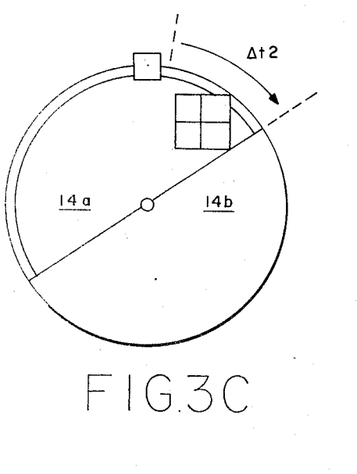
Figure 3D:
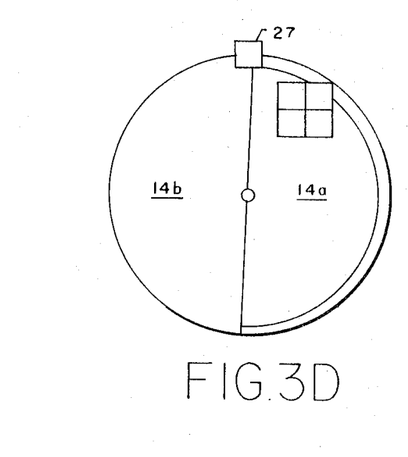

The sequence of pulses E2 is employed to trigger a one shot multivibrator 39 which is given a delay time of $\Delta t1$ corresponding to the travel time of the filter boundary 17 from the optical sensor location to the edge of the radiation detector cell 20 (FIGS. 3A and 3B). The $\overline{E3}$ signal at the output of the one shot 39 then consists of a sequence of negative going pulses having a pulse width of $\Delta t1$.

The $\overline{E3}$ signal is employed to trigger another one shot multivibrator circuit 40 which is given a delay time of $\Delta t2$ corresponding to the travel time of the filter boundary 17 as it sweeps across the detector 20 surface (see FIG. 3C). The Q and $\overline{Q}$ outputs signals of the one shot 40 are applied to further pair of FEDS 41-1 and 41-2, respectively, which serve to detect the falling edges of the E4 signal and its complement. The output pulse sequences produced by the FEDS 41-1 and 41-2 are inverted by inverters 42-1 and 42-2 to produce the positive going pulse sequences E5 and E6, respectively. The E5 pulse sequence is then gated by NAND gates 43-1 and 43-3 under the control of the E1 and $\overline{E1}$ signals, respectively, to the set S inputs of set reset flip flops 44-1 and 44-2, respectively. On the other hand, the E6 signal is gated by NAND gates 43-2 and 43-4 under the control of the E1 and $\overline{E1}$ signals to the reset R inputs of the flip flops 44-a and 44-2, respectively. The $\overline{Q}$ outputs of the flip flops 44-1 and 44-2 are then amplified and inverted in line drivers 45-1 and 45-2 to produce the $S_L$ and $S_S$ sampling signals, respectively.

Although the line drivers 45-1 and 45-2 may assume any suitable form, they preferably take the form of the design illustrated for line driver 45-1. This design includes an operational amplifier 45-11 having its noninverting input grounded and inverting input coupled by way of resistor 45-12 to the $\overline{Q}$ output of flip flop 44-1. The inverting input is also coupled by way of a resistor 45-13 to a voltage source which is negative with respect to ground and designated as $-V2$. A clamping circuit consisting of back-to-back Zener diodes 45-14 and 45-15 is connected between the output and inverting input leads of the amplifier with the illustrated polarity. These diodes serve to clamp the $S_L$ sampling signal to 5V.

The various circuits shown in block form in the drawings may take on any suitable form. For example, the logic gates, one shots and flip flops may be selected from either or both of the following catalogs: Fairchild TTL Family, Oct., 1970, a catalog of Fairchild Semiconductor Corp.; or MSI/TTL Integrated Circuits from Texas Instruments Bulletin CB-125, a catalog of Texas Instruments, Inc. Each of the operational amplifiers may suitably be a model 741 operational amplifier available from Fairchild Semiconductor Corp. The dividers 76 and 77 may take the form of Multiply/Divide units, Model 4029/25, available from Burr-Brown Corporation. The junction field effect transistors may suitably be type 2N4391 while the bipolar transistor may suitably be type 2N2219.

There has been described radiation detection apparatus which discriminates between targets having different spectral characteristics and which is characterized by a rotating spectral filter and sampling technique. Although the illustrated embodiment is specifically applicable to an aircraft warning system, the radiation detection apparatus can also be embodied in missile and/or aircraft guidance systems wherein the X and Y signals are employed to drive a servo-guidance mechanism instead of or in addition to a display device.

It is to be understood that in other embodiments numerous design changes can occur. For example, the sampling signals $S_L$ and $S_S$ can be derived by means other than the optical sensor 27. Thus, magnetic field sensing principles can be employed in place of the optical sensing device. Alternatively, the spectral filter pattern can be so arranged that the detector signal itself will include self clocking information. An example of such a spectral filter arrangement is shown in our copending application entitled Radiation Sensor and Tracking Apparatus, filed concurrently herewith wherein one spectral filter occupies only a small corner of the reticle surface with the remainder being covered by the other filter. In such case, the detector output signal has a distinctive change in amplitude as the small spectral filter sector sweeps across the detector cell. This change in amplitude can be detected and employed to produce long and short wave length sampling signals $S_L$ and $S_S$. Also, a single reticle may be employed with plural detector cells as shown in the aforementioned copending application.

What is claimed is:

1. Radiation detection apparatus for discriminating between radiations which have different spectral distributions; said apparatus comprising:
    an optical device for collecting incident radiations and focusing same;
    a filter for filtering the collected and focused radiations;
    a detector element for converting the filtered radiations into an electrical signal;
    said filter including
    a. a revolving reticle for spatially filtering the collected radiations;
    b. first and second bandpass spectral filters which pass radiations of long and relatively short wavelength, respectively, said spectral filters being so arranged on said reticle and said detector element being so located that the detector element receives filtered radiation from the first and second filters during first and second portions, respectively, of a reticle revolution;
    means for producing first and second sampling signals during said first and second reticle revolution portions, respectively;
    means responsive to the first and second sampling signals to convert said electrical signal produced by the detector element into first and second sequences of signal samples indicative of long and short wavelength filtered radiation, respectively;
    means for comparing the first and second sequences of signal samples with one another to produce a comparison signal; and
    means for producing a target signal when the amplitude of said comparison signal at least equals a predetermined value.

2. Radiation detection apparatus as claimed in claim 1 and further including
    means for enabling and inhibiting said target signal producing means whenever said long wavelength filtered signal is greater than and less than, respectively, a reference value.

3. Radiation detection apparatus as set forth in claim 2
    wherein said comparison means includes amplifier means for multiplying the second signal sample sequence by a constant K and difference amplifier means for taking the difference between the first sequence of signal samples and the second sequence of signal samples multiplied by K so as to produce a difference signal which corresponds to said comparison signal.

4. Radiation detection apparatus as set forth in claim 3
    wherein said signal conversion means includes first and second analog switches responsive to the first and second sampling signals to convert the electrical signal into said first and second sequences and signal storage means for storing each said signal sample during the revolution portion when its associated switch is turned off.

5. Radiation detection apparatus as set forth in claim 4
    wherein said sampling signal producing means includes a narrow annular band of mirrorlike material disposed upon one of said spectral filters near the outer circumference of the reticle, a light storage and light sensing unit disposed adjacent said annular band with the light source emitting light directed towards said annular band and the light sensor producing an output signal having first and second values corresponding to the presence and absence of said mirrorlike band, and signal processing means responsive to the light sensor output signal to produce said first and second sampling signals.

6. Radiation detection apparatus as set forth in claim 5
    wherein said target signal producing means comprises a coincidence gate having a first input coupled to receive said comparison signal and a second input coupled to receive the output of said enabling and inhibiting means.

* * * * *